Jan. 30, 1962  J. NOALL ETAL  3,019,153
APPARATUS FOR BUILDING TIRES
Filed Dec. 11, 1958
9 Sheets-Sheet 1
FIG. 1
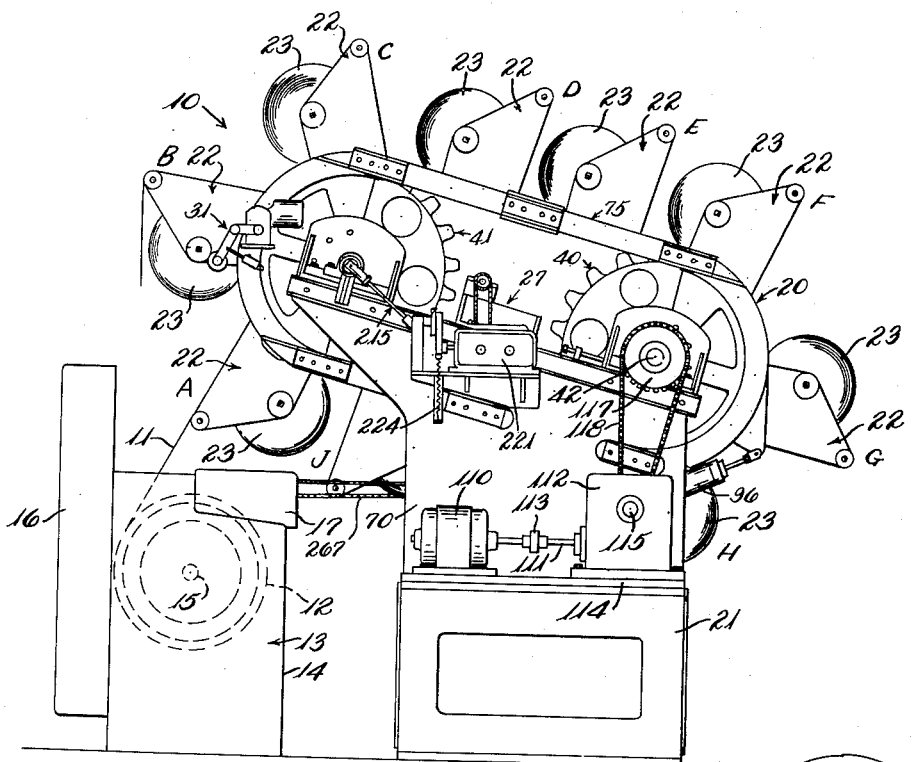
FIG. 5
FIG. 9
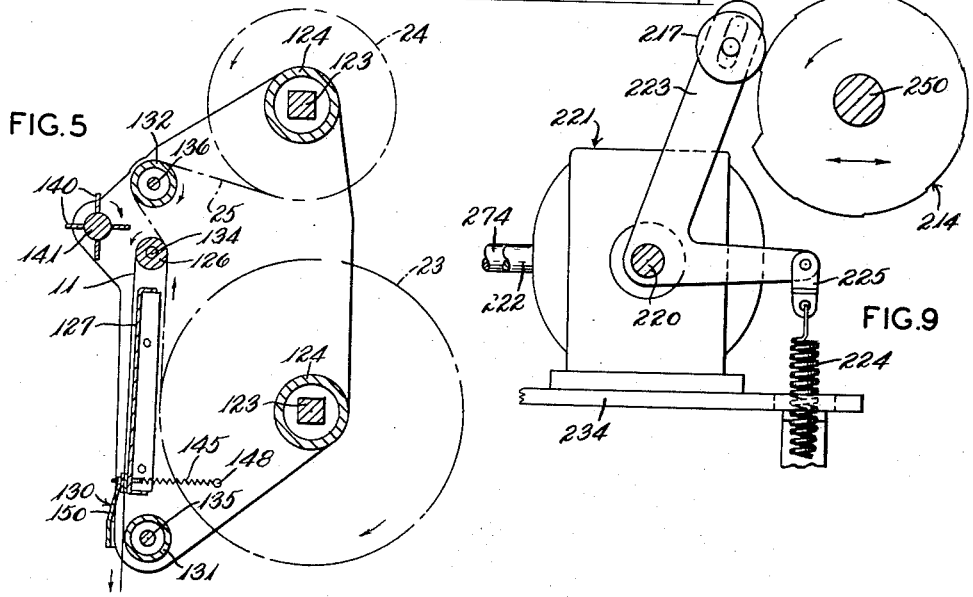

Jan. 30, 1962    J. NOALL ETAL    3,019,153
APPARATUS FOR BUILDING TIRES
Filed Dec. 11, 1958    9 Sheets-Sheet 2
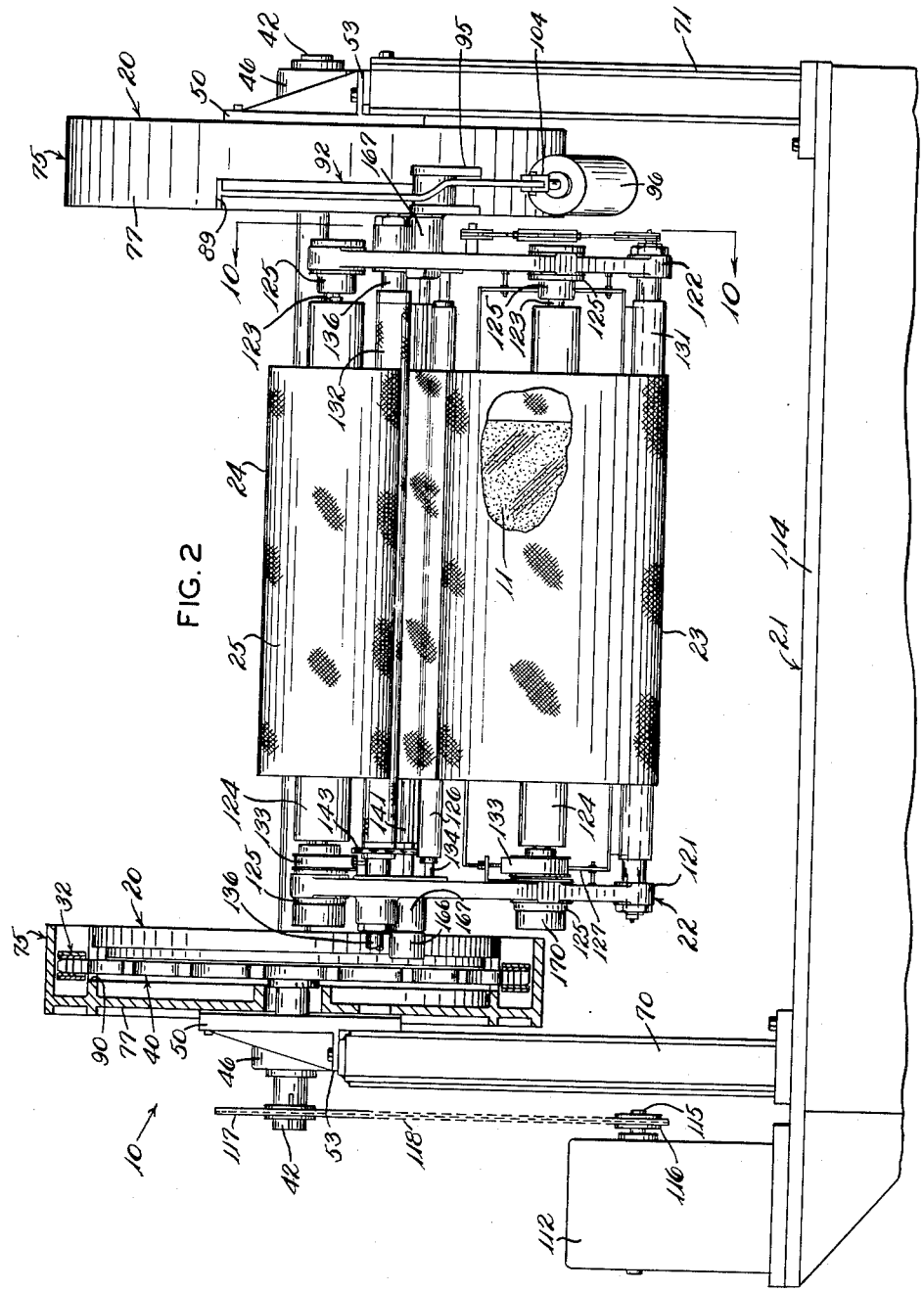

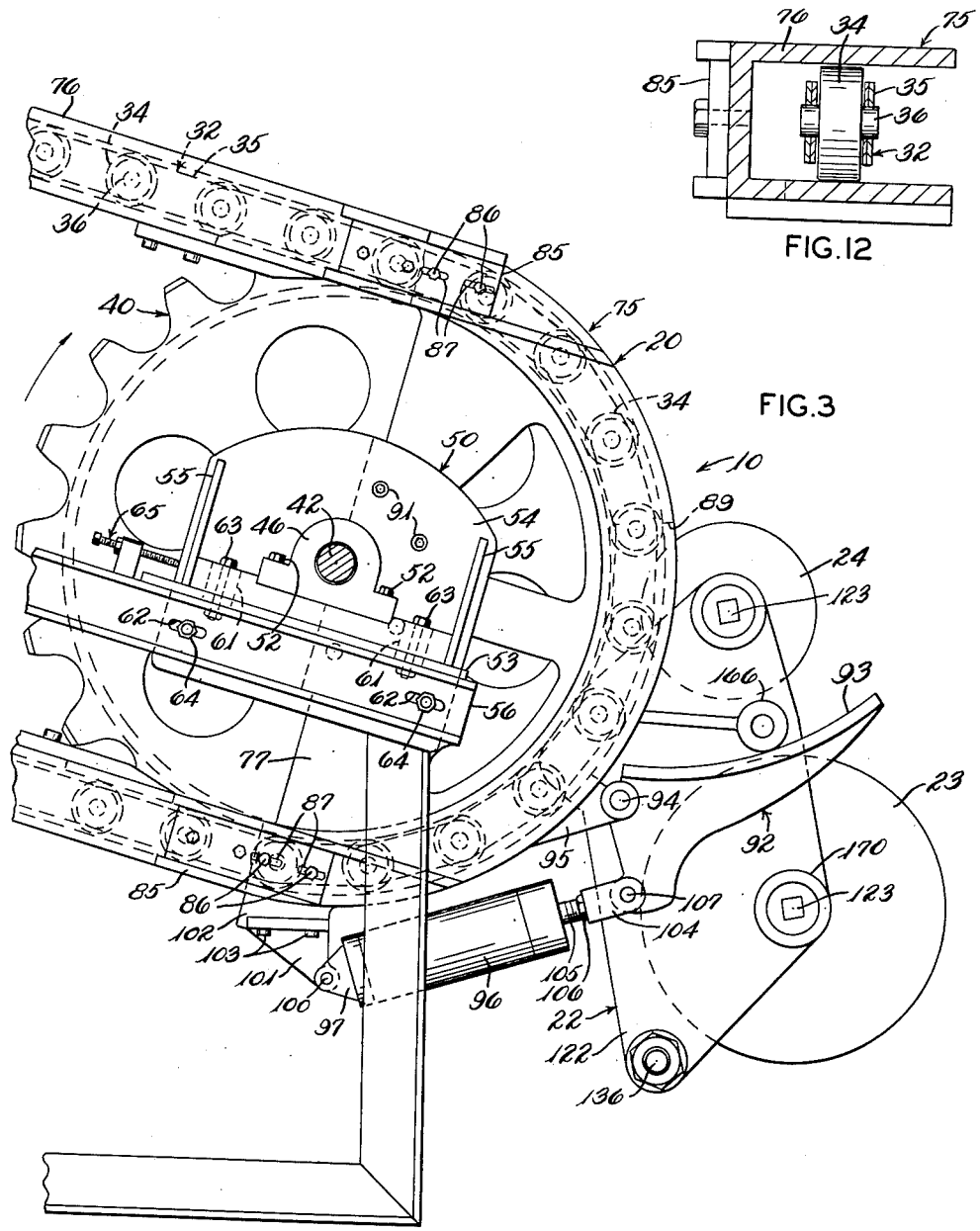

Jan. 30, 1962  J. NOALL ETAL  3,019,153
APPARATUS FOR BUILDING TIRES
Filed Dec. 11, 1958  9 Sheets-Sheet 4

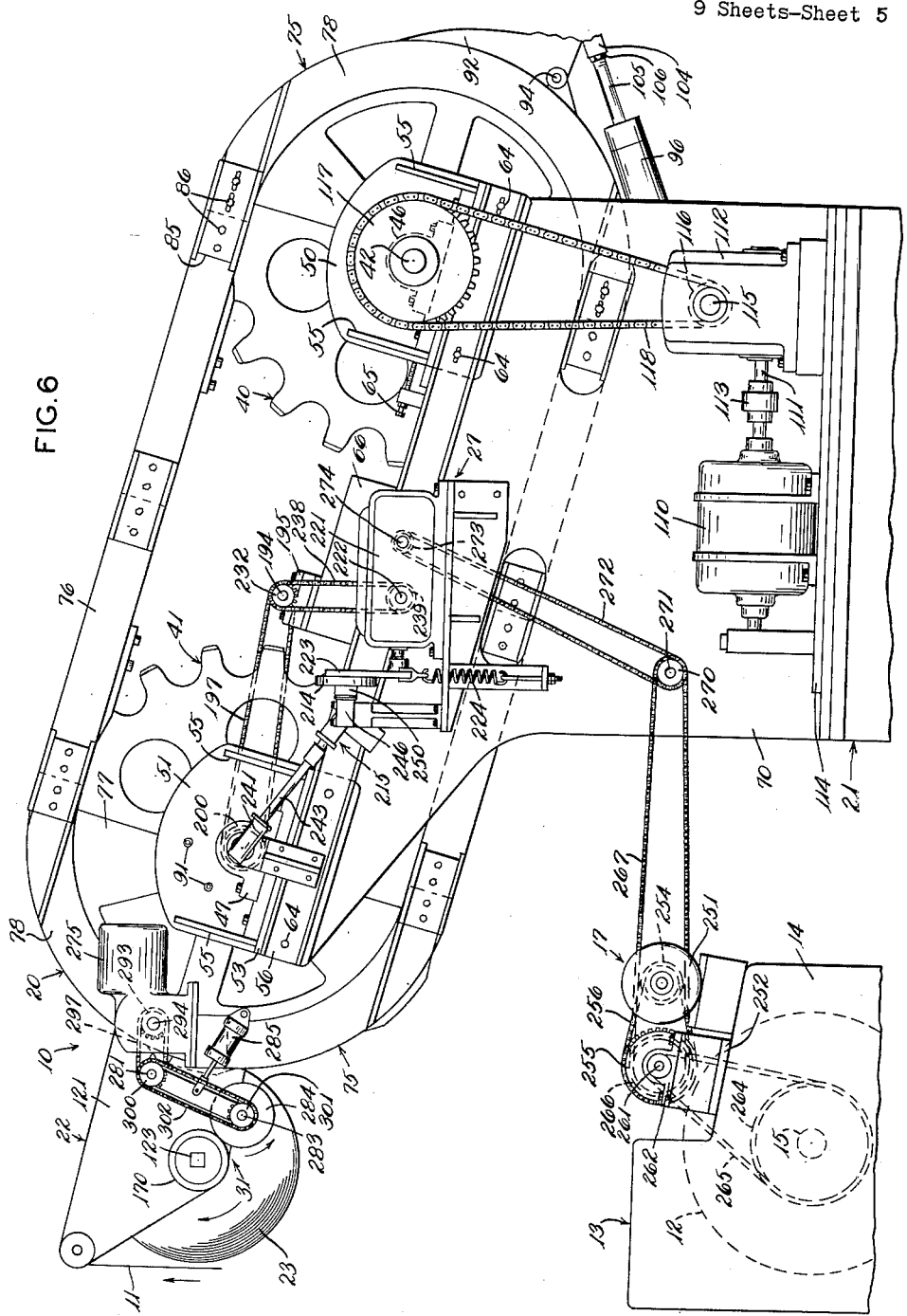

Jan. 30, 1962 J. NOALL ETAL 3,019,153
APPARATUS FOR BUILDING TIRES
Filed Dec. 11, 1958 9 Sheets-Sheet 7
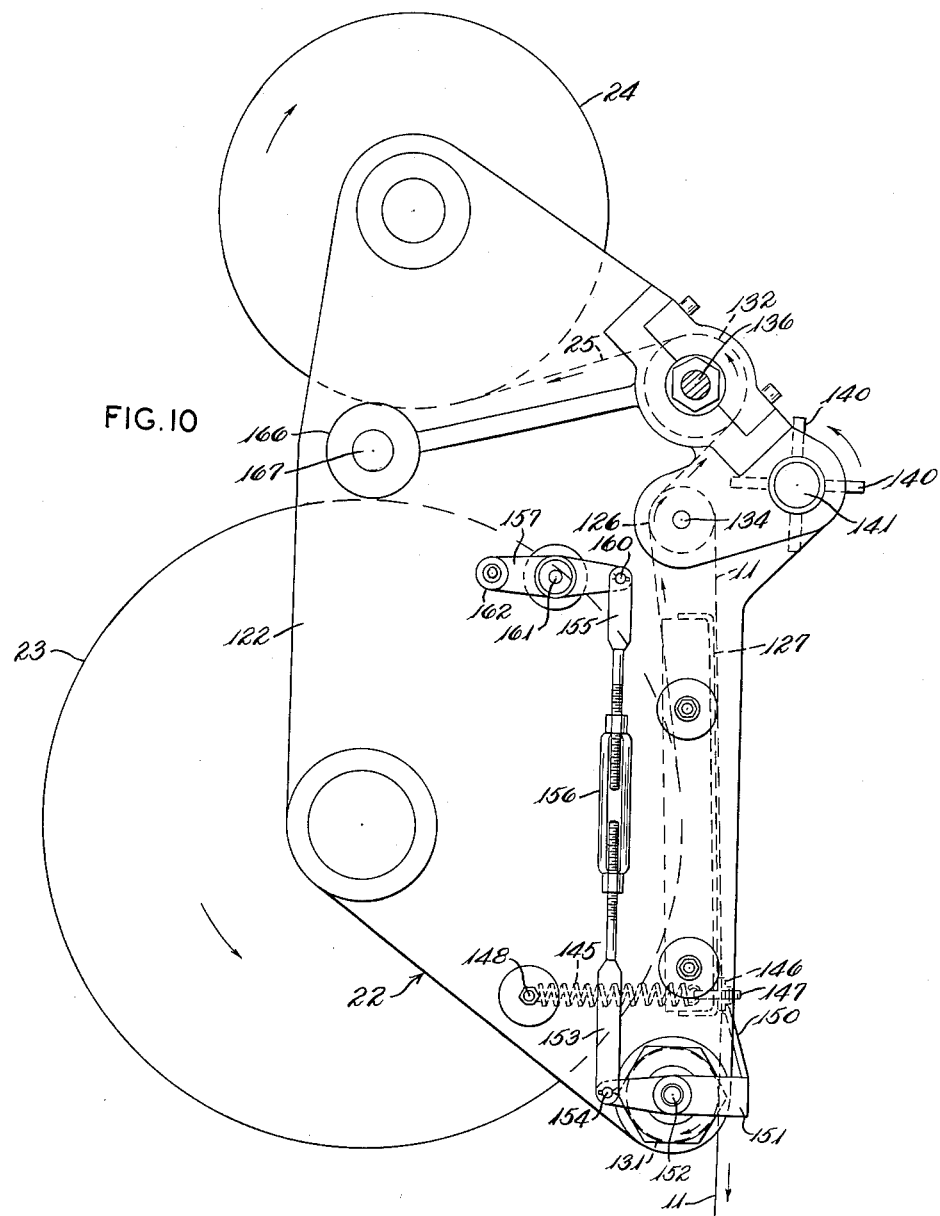

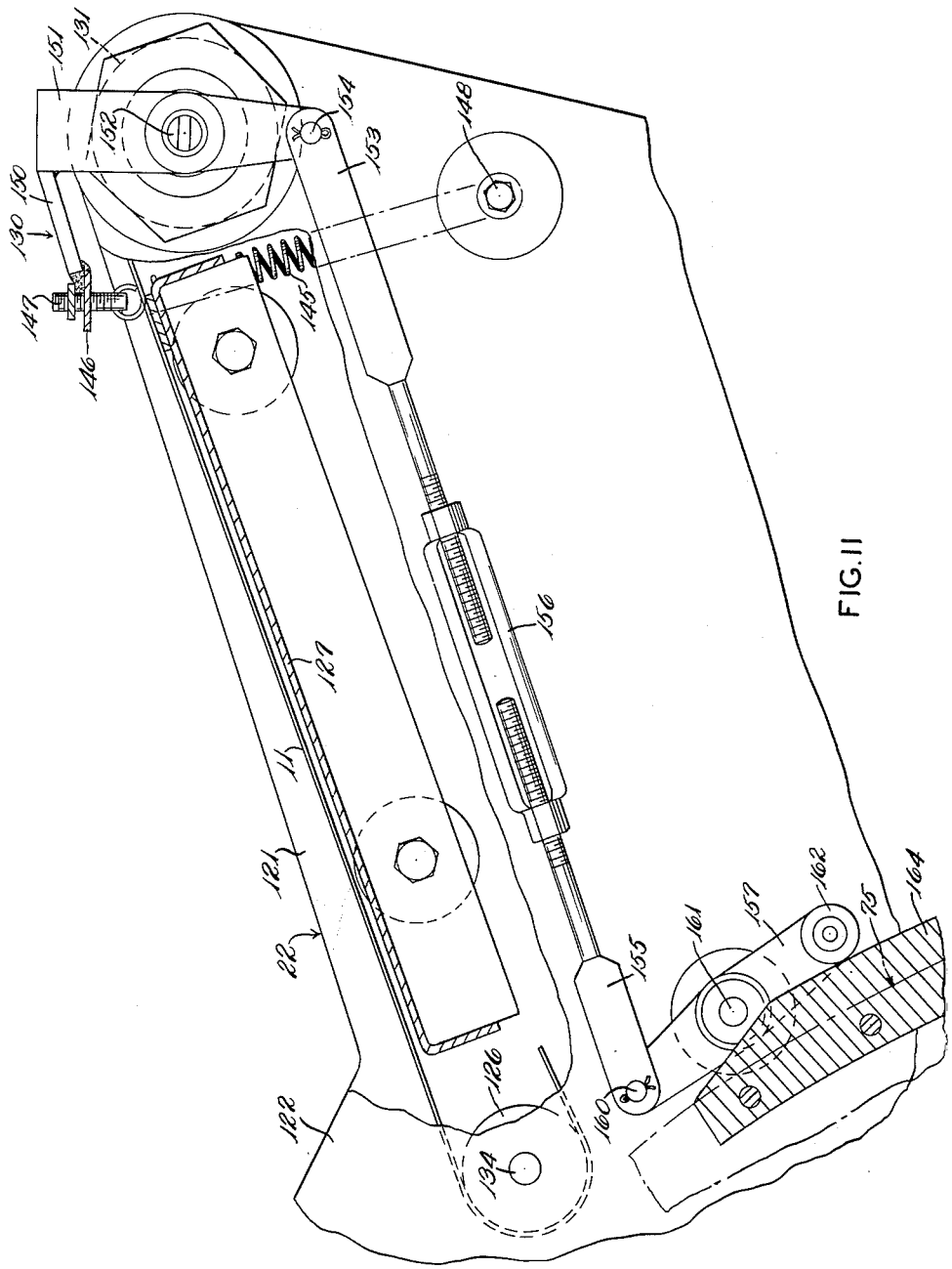

United States Patent Office 3,019,153
Patented Jan. 30, 1962

3,019,153
APPARATUS FOR BUILDING TIRES
John Noall, Cuyahoga Falls, and Roy R. Putt, Akron, Ohio, assignors to The Firestone Tire & Rubber Company, Akron, Ohio, a corporation of Ohio
Filed Dec. 11, 1958, Ser. No. 779,580
1 Claim. (Cl. 156—406)

*Disclosure of patent application*

This invention relates to means for handling continuous elements and more particularly to means for receiving, storing and dispensing rubberized fabric, gum strips, and the like, used in the construction of pneumatic tires.

The fabric-reinforced bodies of pneumatic tires are built by adhering successive plies of rubberized weftless fabric to each other upon a collapsible tire building drum. Separate plies, each having different widths, thicknesses, cord angles, and other characteristics require the use of separate devices called "stock servers" to deliver each ply to the tire building drum as needed.

Present stock servers generally comprise a frame supporting a plurality of rolls, from which the tire builder sequentially withdraws sheets of fabric which form the various plies going into the tire.

A problem in conventional stock servers has been the dispensing of plies under conditions of controlled, constant tension. Attempts to solve this problem have included the suggestion to use a friction drag in the stock roll let-off mechanism or to use dead weight rollers in so-called festoon compensators associated with such mechanisms. These and other such devices are not entirely satisfactory for various reasons including a lack of accurate control of uniform tension. Also the cord is badly distorted during the withdrawal of the ply from the server and application to the tire body. Such distortion results in wrinkles, folds, and air pockets in the finished tire.

The present invention provides apparatus and method for building a tire body comprised of concentric, annular plies of different sizes and kinds of rubberized fabric. The plies are individually uniform in cord count and cord angle and collectively uniform in tension. This desirable result is accomplished by adhering the leading edge of one sheet to a tire building drum, rotating the drum at a constant angular speed for one complete turn while simultaneously dispensing the fabric at a controlled speed equal to or less than the surface speed of the drum. Additional plies are added successively in a similar manner while increasing the speed at which the fabric sheet is dispensed in controlled increments to compensate for the increase in the surface speed of tire band as it is built up on the drum by addition of successive plies.

This desirable result is obtained by a novel arrangement of apparatus including an endless conveyor having multiple fabric storage stations sequentially indexable at a feed position adjacent a tire building drum rotatable at a constant angular speed. Means are provided to feed fabric to the drum at different speeds to compensate for ply build-up on the drum. Other novel arrangements of apparatus to be described cooperate to attain the objects of the invention.

Accordingly, it is the general object of the invention to provide improved means for dispensing fabric to a tire building drum.

A more specific object is to provide means for applying tire plies uniformly to a building drum by controlling the tension of tire fabric sheets as they are dispensed while progressively compensating for the increase in surface speed of the tire body as the drum rotates and that body is built-up.

Another object is to provide apparatus for unrolling tire fabric from a storage roll by applying substantially all of the unwinding tension to the protective liner within the convolutions of which the fabric is wound.

Yet another object is to provide tire fabric conveying apparatus, including an individual frame on which a stock roll and its adjacent liner roll are mounted in fixed relation, whereby the tautness of the protective liner extending between the two rolls is unaffected by movement of the conveying apparatus.

Another object is to provide apparatus for changing the surface speed at which tire fabric is dispensed from one roll in proportion to the increased diameter of a tire band resulting from application of fabric dispensed from a preceding roll.

Another object is to provide means to substantially eliminate the effect of friction and inertia on the uniformity of tire fabric as it is pulled from the dispensing mechanism onto a tire building drum.

Another object is to provide a method of drum-building a tire body which comprises forming sheets successively into concentric annular plies, one upon the other on a drum turning about its axis at a constant angular speed, while simultaneously unrolling the sheets at a surface speed slower than the peripheral surface speed or the forming tire band and increasing the speed of unrolling the sheets in controlled increments proportional to the increase in the surface speed of the forming tire band caused by the additional thickness of each successive layer. These and other objects and advantages will appear from the following description of a preferred form of the invention, reference being had to the accompanying drawings in which:

FIG. 1 is a side elevation of the stock server and an associated tire building drum employing the present inventions;

FIG. 2 is the rear elevation of the apparatus shown in FIG. 1 on an enlarged scale, partially broken away and in section;

FIG. 3 is a fragmentary elevation of the right-hand portion of the apparatus of FIG. 1, showing the components in position for loading or unloading the stock cradle;

FIG. 5 is a vertical section of one of the stock roll cradle, showing the path of travel of fabric and its protective liner;

FIG. 6 is an enlarged side elevation of the apparatus of FIG. 1 showing the various drive mechanisms;

FIG. 9 is an enlarged fragmentary sectional view, taken along the line 9—9 of FIG. 7;

FIG. 10 is an enlarged end elevation of one of the stock roll cradles, taken along line 10—10 of FIG. 2;

FIG. 11 is an enlarged fragmentary view partially in section showing the fabric clamping device of FIG. 10;

FIG. 12 is an enlarged fragmentary sectional view taken along the line 12—12 of FIG. 4;

*General arrangement of the apparatus*

Figure 4:
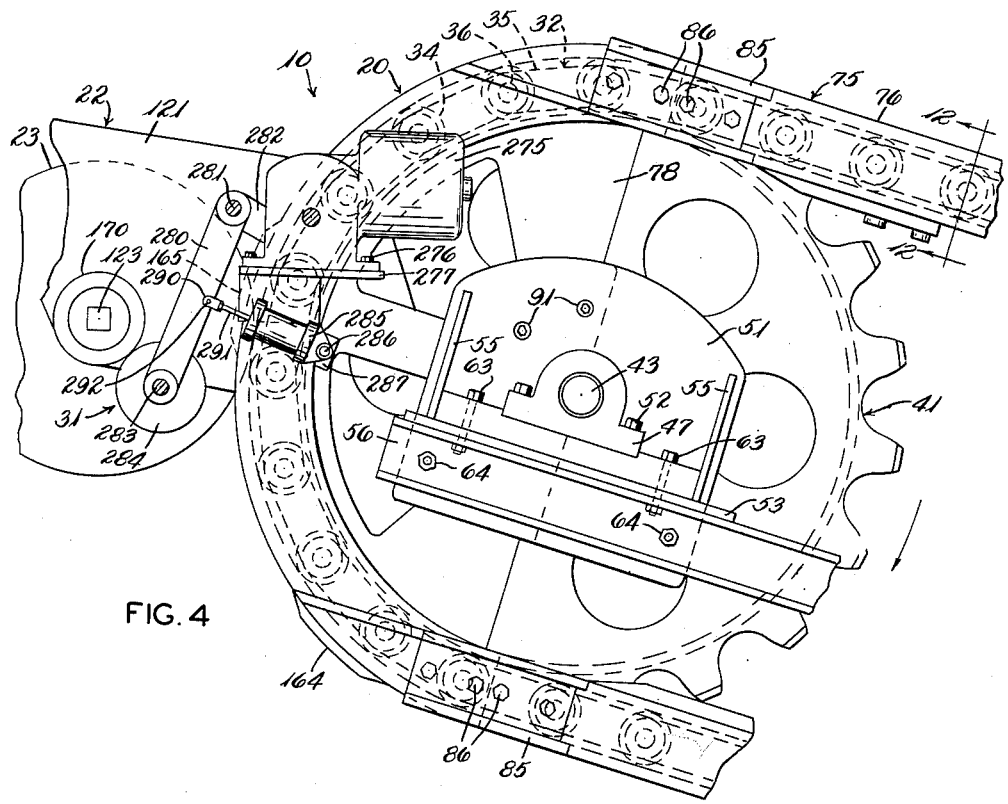
FIG. 4 is a fragmentary elevation of the left-hand portion of the apparatus in FIG. 1 showing the fabric sheet dispensing end.

Referring to FIG. 1 of the accompanying drawings, a stock server, generally indicated at 10, driven by motor 11 to a tire building drum 12 associated with a tire building machine 13.

The tire building machine 13 includes a suitable housing 14, means for rotating the drum, a cantilevered shaft 15 upon which the drum is removably mounted and means for applying bead grommets to a tire body (not shown), as well as means for stitching the various components together to form a complete tire ready for subsequent shaping and vulcanization.

Operation of the machine in performing the various tire building operations is initiated and controlled in proper sequence by suitable controls (not shown), but mounted on panel 16.

A typical tire building drum and a typical tire building machine with its allied controls are shown in United States Patents issued to H. D. Stevens, Nos. 2,514,215 and 2,354,434 respectively. The construction and operation of the drum, the building machine, and the controls are well-known and understood by those skilled in the art.

An auxiliary drive 17, mounted on housing 14, rotates the drum 12 at a constant angular speed for a single revolution during the application of an individual ply to a tire body, and simultaneously drives the fabric dispensing apparatus.

The conveyor

Conveyor 20 (FIG. 3) comprises cradles 22 carried at each end by a pair of parallel endless chains, such as the one indicated at 32, made up of rollers 34 axially mounted on pins 36 and held in alignment by links 35 (FIGS. 3, 4 and 12). Each chain is supported by a pair of sprockets such as 40 and 41, suitably secured to shafts 41 and 43 supported by a pair of pillow block bearings 46 and 47, respectively, mounted on bearing brackets 50 and 51 by screws 52. The bearing brackets 50 on the portion of the conveyor remote from the tire building machine (FIG. 3) are each comprised of a base 53 and an attached end plate 54, stiffened by gussets 55. These brackets are mounted on the ends of the channels 56 by means of bolt and nut assembly 63 adapted for sliding action in slots 61. The channels 56 also are each provided with a pair of horizontal slots 62 and lock nuts 64 so that the tension in chains 32 may be controlled by manipulation of screw and lock nut assemblies 65 which bear upon brackets 50, sliding them along channels 56 and thereby changing the distance between shafts 42 and 43 (FIGS. 3 and 4). Channels 56 are braced by cross members 66 (FIGS. 1 and 7) and are supported by the vertical side members 70 and 71 on frame 21 which, in turn, is supported by the frame 21.

Chains 32 roll in endless tracks generally indicated at 75 of substantially U-shaped cross section (FIGS. 3 and 4) mounted on the end plate such as 54 by nut and bolt assemblies 91. The track assemblies on each side of the server are identical, but of opposite hand, so the description of one will serve for both.

Track assembly 75 comprises four straight castings such as 76 (FIG. 1), joined to two semi-circular castings 77 and 78, all substantially U-shaped in cross-section and assembled by abutting their respective ends together and aligning them by means of reinforcing splice plates such as 85. Slots 87 are provided at the end of the track assemblies remote from the tire building drum to permit adjustment of the track assembly when the tension of the conveyor chain is adjusted. The radially innermost flange 90 (FIG. 2) of the track 75 is cut away sufficiently at the right and left end of the assembly to provide clearance for the conveyor sprockets.

It will be seen that cradles 22 and their related parts serve as fabric storage stations which may be sequentially indexed at positions A through J (FIG. 1) by means to be described, position A being a feed position from which fabric is dispensed to the tire building drum 12.

Loading mechanism

For loading and unloading fabric rolls onto cradles 22, a loading bracket 92 having an arcuate portion 93 forming part of track 75 but removable to form opening 99 is pivotally secured at 94 to a lug 95 of casting 77. Bracket 92 is moved about pivot 94 by a fluid operated cylinder 96, while a clevis 97 is pivotally secured at 100 to a bracket 101 mounted on a lug 102 of casting 77 by means of bolts 103. A second clevis 104 threaded on a piston rod 105 and locked by nut 106 is pivotally connected at 107 to bracket 92. Thus, as the cylinder shaft is extended the loading bracket is moved in an arcuate path about pivot 94 until its arcuate portion 93 fits into opening 89 and completes track 75 in the closed position. When the cylinder shaft is in the retracted position as shown in FIG. 3, the arcuate portion of the loading bracket serves as a support for the cradle.

Conveyor drive mechanism

As best shown in FIGS. 2, 5 and 10, stock cradles such as 22 comprise a pair of parallel side members 121 and 122 joined by shafts (to be described) of several rollers which serve as cross-members for the cradle.

The stock and liner rolls are removably supported within the cradle on shells 124, supported by bars 123 of square-shaped cross-sections supported at each end in bearings 125 in the side members.

The path of travel of the fabric sheet 11 and the liner 25 is defined by an idler roller 126 (FIG. 5), a guide plate 127, supporting a fabric clamp 130, and finally a breakover roller 131. The liner is separated from the fabric at idler roller 126 and follows a path defined by a knurled roller 132 to a liner roll 24. Stock and liner rolls may be restrained in rotation by snubbing devices such as brake mechanisms 133 (FIG. 2) attached to side member 121.

Rollers 126, 131 and 132 are all tubular idler rollers with ball bearings (not shown) mounted at their ends. The rollers turn about shafts 134, 135 and 136 respectively.

Occasionally, as the rubberized fabric is withdrawn from the storage roll, it sticks to the liner so that the liner and fabric do not separate from each other at rollers 126. When this occurs and the liner carries a small loop of the fabric back toward roller 132, vanes 140 of an intervening kicker roll 141 rotatably supported by cradle side members contact the loop momentarily and free the fabric from the liner. Rotation of knurled roller 132 drives the kicker roll through a chain and sprocket arrangement indicated generally at 143 in FIG. 2.

Fabric clamp

The attitude of the cradles with respect to a horizontal plane changes during operation of the device (FIG. 1). Therefore, if the fabric sheets were not restrained while the cradles were in the attitude shown in positions C through G (FIG. 1), those sheets would fall away from the guide plate and become entangled in the conveyor. To prevent this the sheets are lightly clamped to the guide plate by a clamp such as 130 shown in FIG. 10.

A foot 146 is biased against plate 127 by tension spring 145 attached to the cradle by bolt 148, and acting to hold the fabric to the guide plate at a point adjacent to roller 131. Tension spring 145 is adjusted by manipulation of screw 147.

Foot 146 merges with an extension 150 on one end of a crank arm 151 pivoted at 152 having a clevis 153 pivotally mounted at 154 on its other end. Clevis 153 is mounted through turnbuckle 156 to another clevis 155 pivotally supported at 160 on one end of crank arm 157, the crank arm pivoted at 161 and mounting on its free end cam follower 162.

As the fabric is normally clamped to plate 127 during the travel of the cradle around the conveyor it is necessary to open the clamp when the cradle is at position A, ready to dispense fabric sheets to the building drum 12, and again when the cradle is at the fabric rewinding position B (FIG. 1). As the cradle moves into position A, a cam 164 mounted on track assembly 75 engages cam follower 162 and pivots arm 157 counter-clockwise to open clamp 130.

Clamp 130 is opened in a similar manner by a second cam 165, when the cradle is at the rewinding position B, as shown in FIG. 11. As the cradle leaves either position A or B, cam follower 162 moves from the respective cam, and spring 145 biases foot 146 against the fabric sheet to clamp it to plate 127. At the same time, arm 157 through the linkage is rotated clockwise until cam follower 162 is in its normal position as shown in FIG. 10. Proper engagement of the cam follower by the cams is maintained by adjustment of turnbuckle 156.

Roll stabilizer

The cradle is suspended from the conveyor chains by the ends of shaft 136 which extends upwardly from the cradle side members. Each end of the shaft 136 replaces a roller pin 36 (FIG. 2) at a link junction in its corresponding chain and moving in U-shaped track 75. The cradle is stabilized by a pair of rollers 166 rotatably mounted on stub shafts 167, which are secured to and extend outwardly from the side members of the cradle and also move in the U-shaped tracks 75. Thus, the cradle 22 is suspended at two points on each side of the conveyor and is prevented from pivoting about the two rollers 34 which carry the shaft 136 at each end in tracks 75. The cradle maintains the same attitude with respect to the chains throughout the movement of the conveyor.

When the cradle is in position for loading and unloading (position G in FIGS. 1 and 3), the cradle does pivot about shaft 136 on chain roller 34 and stabilizing rollers 166 are supported by the arcuate portions 93 of loading brackets 92 as the brackets are lowered to permit loading and unloading of the cradle.

When the cradle is at the rewinding position B (FIGS. 1, 4 and 7) a rewinding mechanism 31 (subsequently to be described) contacts a roller 170 secured to bearing 126 which supports one end of the bar 123 of the stock roll.

The surface driving unit

Figure 8:
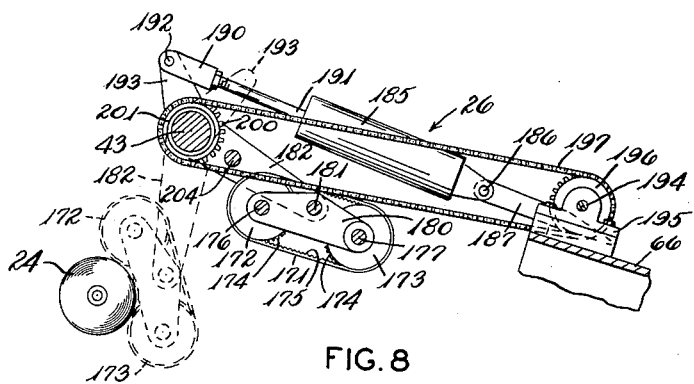
FIG. 8 is an enlarged fragmentary sectional view taken along the line 8—8 of FIG. 7, showing the liner roll surface drive mechanism.
Figure 7:
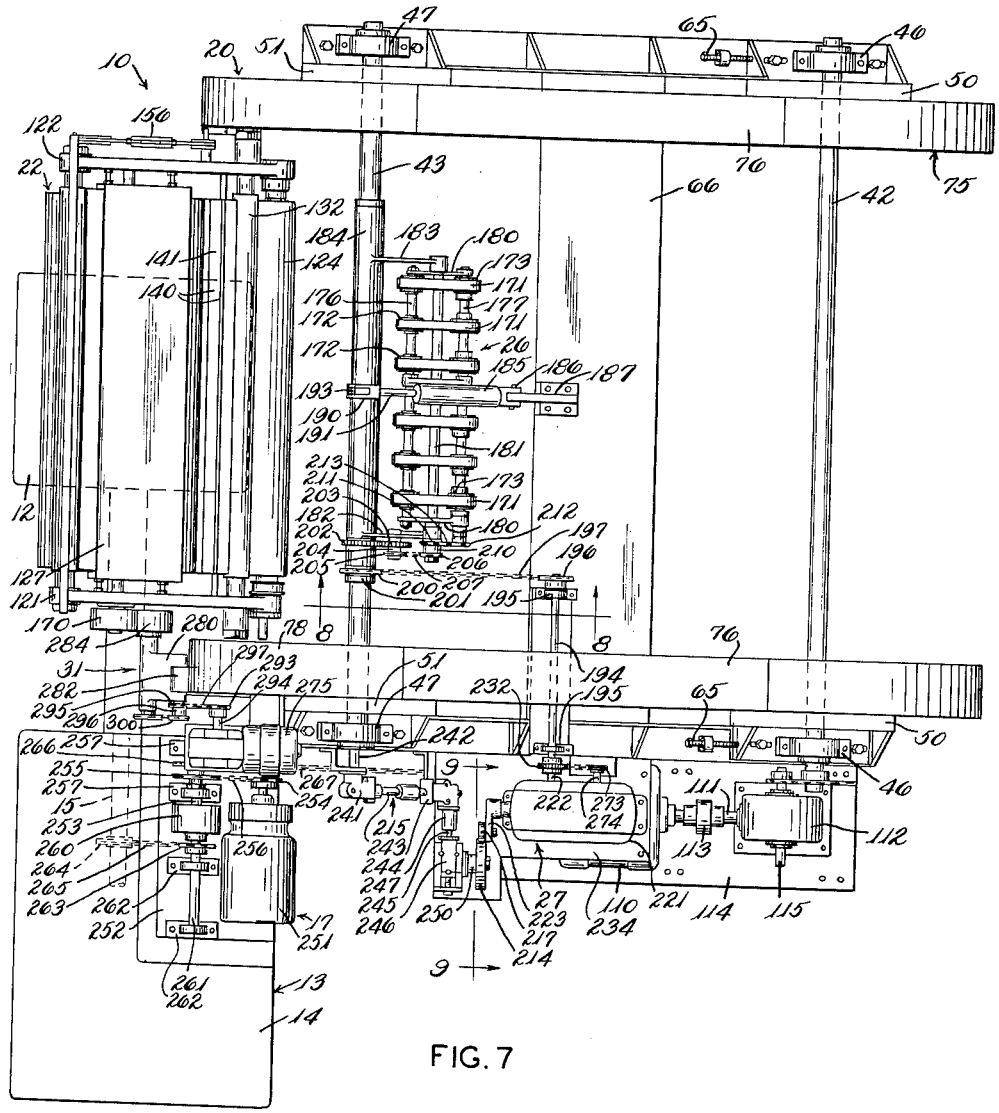
FIG. 7 is a top plan view of the apparatus of FIG. 6 with some of the components eliminated for clarity.
Figure 13:
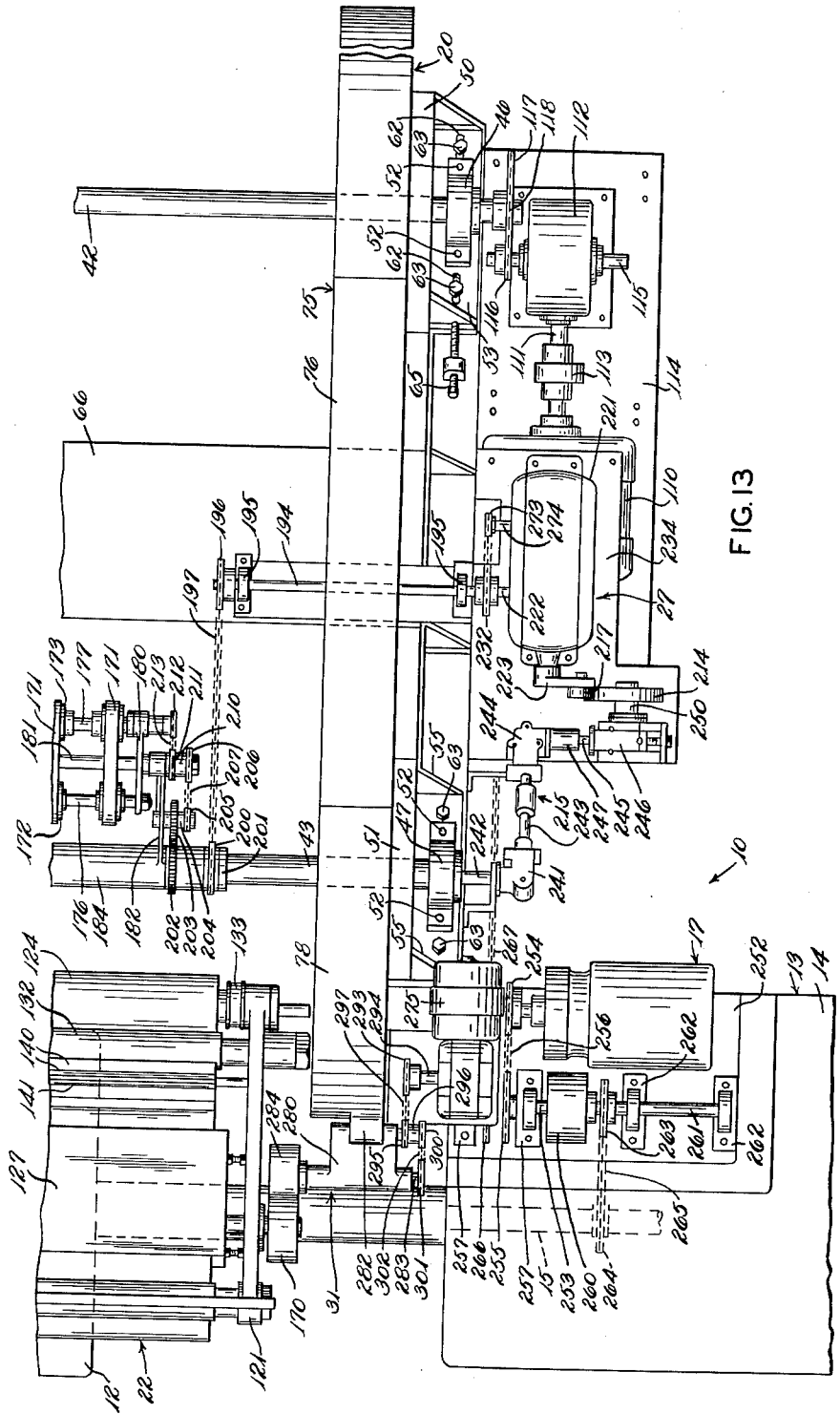
FIG. 13 is an enlarged fragmentary plan view of the lower portion of FIG. 7.

The tire fabric is dispensed from the cradles to the building drum by a surface driving unit indicated generally at 26 in FIGS. 7 and 8. When the cradle is at position A (FIG. 1) on the conveyor for fabric to be delivered to the building drum, the surface driving unit rotates the liner roll 24 by frictional engagement with its outer surface and pulls the combination of fabric and liner from the stock roll 23. The surface driving unit comprises a plurality of endless cogged belts 171 supported by idler pulley 172 and driven pulley 173 both of which have teeth 174 matching the teeth 175 of the belt to prevent slippage of the belt on the pulley. The idler pulleys are rotatably mounted on a fixed shaft 176, while the driven pulleys are secured to a rotatable shaft 177. A pair of end plates 180, pivotally supported by a fixed shaft 181 supports shafts 176 and 177. Shaft 181 is carried by brackets 182 and 183 of tubular member 184 which is pivotally supported by conveyor shaft 43. The belts are here urged into contact with the liner roll by means of a fluid-operated cylinder 185 which is pivotally connected at 186 to a mounting bracket 187 secured to cross-member 66 of frame 21. A clevis 190 is fixed to piston rod 191 at cylinder 185 and is pivotally connected at 192 to crank arm 193 of tubular member 184.

Engagement of belts 171 with liner roll 24 (FIG. 8) is accomplished by the retraction of piston rod 191 which pivots crank arm 193 and bracket 182 of tubular member 184 clockwise about conveyor shaft 43 until the belts are in contact with the liner roll as shown by the dotted lines in FIG. 8. Extension of piston rod 191 disengages the belts from the liner roll in that arm 193 and bracket 182 pivot counter-clockwise carrying the belts to the position indicated by the solid lines when the piston rod is fully extended.

As shown in FIGS. 6, 7 and 8, the belts are driven by variable speed control 27 through shaft 222, sprocket 239, chain 238, sprocket 232, shaft 194 carried by pillow block bearings 195 mounted on frame cross-member 66. A sprocket 196 is secured to the inner end of shaft 194 and drives a chain 197 which in turn drives a second sprocket 200 secured to a short tubular member 201 mounted adjacent to the long tubular member 184 on conveyor shaft 43. Also secured to member 201 is a gear 202 which engages and drives a second gear 203 secured to shaft 204 rotatably mounted on bracket 182. A third sprocket 205 is also secured to and driven by shaft 204. Sprocket 205 drives a fourth sprocket 206 through a second chain 207, and sprocket 206 is secured to a bushing 210 rotatably mounted on shaft 181. A fifth sprocket 211 is secured to and driven by bushing 210. Sprocket 211 drives a sixth sprocket 212 through a third chain 213. Sprocket 212 is secured to and drives shaft 177, upon which the cogged belt-driving pulleys 173 are secured.

The auxiliary drive and constant tension mechanism

Constant tension on the plies of a tire body being assembled on a building drum is achieved by providing an auxiliary drive 17 which drives the building drum at a constant angular speed for one revolution. Drive 17 simultaneously drives the surface driving unit 26 feeding the fabric to the drum 12 at a lineal speed which is proportional in a pre-determined fixed ratio of unity or less to the surface speed of the tire body on the drum.

As the successive plies of a tire body are formed on the drum, the increase in the diameter of the tire body results in an increase in its circumference by an increment equal to 2Π multiplied by the thickness of each ply added. To maintain constant tension in the successive plies while they are being formed, the lineal speed of the surface driving unit 26, together with that of the ply-forming fabric sheet dispensed therewith, is increased proportionately to maintain the desired speed ratio.

The increase in the lineal speed of the dispensed fabric sheet is accomplished by means of a conventional variable speed control 221 (FIG. 9), actuated by a stepped cam 214 rotating about its axis at a speed proportional to the movement of the conveyor and which is responsive to the motion of the conveyor. Cam 214 is rotated by conveyor shaft 43 through a drive linkage indicated generally at 215 in FIGS. 6 and 7. Cam follower 217 is journaled on one arm of bell crank 223 which is secured to the control shaft 220. The other arm of bell crank 223 is pivotally attached to a clevis 225 mounted on spring 224 to bias the cam follower 217 against the peripheral surface of the cam 214.

Drive linkage 215 (FIG. 1), which translates the conveyor movement to the cam 214 comprises a right-angled drive unit 241 (FIG. 7) coupled at its input end to a reduced portion 242 of conveyor shaft 43 and at its output end to an end of a shaft 243, coupled at its other end to a second right-angled drive 244, securely mounted on a base plate 234. The input shaft 245 of a third right angled drive 246 is slidably coupled to the output shaft 247 of the second right-angled drive 244, and drive 246 is slidably mounted to base plate 234, permitting lateral adjustment of cam 214 which is secured to the output shaft 250 of drive 246.

The auxiliary drive generally indicated at 17 includes a synchronous motor 251 mounted on base plate 252 secured to housing 14 of tire building machine 13. Motor 251 drives a jack shaft 253 by means of sprockets 254 and 255 and a chain 256. Jack shaft 253 is rotatably secured to base plate 252 by pillow block bearings 257. An air-operated clutch 260 is coupled to the outboard end of shaft 253 and a second jack shaft 261 is rotatably secured to base plate 252 by pillow block bearings 262. A sprocket 263 secured to jack shaft 261 is coupled to another sprocket 264 through a chain 265. Sprocket 264 is secured to shaft 15 which drives tire building drum 12.

Jack shaft 253 carries a second sprocket 266 which is coupled by a chain 267 with a double sprocket 270 secured to a stub shaft 271 rotatably secured to side member 70 of frame 21. Sprocket 270 is also coupled by a chain 272 to a sprocket 273 secured to the input shaft 274 of speed control 221.

The increment of speed change in output shaft 222 for a given eccentricity of the cam is regulated by moving cam follower 217 rotatably mounted on shaft 250 radially with respect to the control shaft. Such movement is made possible by a radial slot 231 in the crank arm in which cam shaft 250 is slidably and securably mounted. By means of this adjustment small errors in the eccentricity of cam 214 may be compensated. The amount of tension in the plies as they are formed on the building drum 12 is determined by the ratio of the lineal speed of dispensing the fabric sheet to the drum to the surface speed of the bare drum in the case of the first ply of the tire and to the speed of the surface of the tire body in the case of all plies subsequent to the first ply of the tire. Since the drum is driven at a constant angular speed and the surface speed of a bare drum is not therefore variable, the lineal speed of the fabric sheet must be changed by the surface driving unit 26 if a different ratio and tension are desired. In a like manner, when building drums of different diameters are substituted one for the other, the initial speed of the surface driving unit 26 and, therefore, the lineal speed of the fabric sheet must be adjusted to compensate for the change in surface speed of the bare drum.

For example, the initial speed of the surface driving unit is determined by the position of control shaft 220 of the speed control 221 when the cradle carrying the fabric for the first ply is at position A. Changes in the initial speed of the surface driving unit are affected by the position of the cam 214. The cam urges the cam follower 217 in an arcuate path and rotates pivot arm 223 and control shaft 220 accordingly. Thus the desired speed is obtained at shaft 194 (FIG. 8) of the surface driving unit 26.

It will be seen that the fabric dispensing means 26 is driven at a different speed as each fabric storage station is indexed in the feed position A.

The rewinding mechanism

After the free end of a fabric sheet has been partially withdrawn from a cradle 22 at a position and attached to the drum, the drum is rotated for one revolution and the sheet is cut to form a ply which has the new end slightly overlapping the free end. The overlapping ends are stitched together and the ply is complete on the drum. A new free end of the fabric sheet is left hanging after the formation of the ply, and this new free end will subsequently become the end of the next ply formed from that sheet of fabric. This new free end and the portion of fabric between it and the cradle hang freely suspended from breakover roll 131. To prevent distortion of the dangling free end by change contact with the apparatus, the sheet is rewound into the cradle by the rewinding mechanism, generally indicated at 31, after the cradle has been indexed to position B as shown in FIGS. 4, 6, and 7.

Mechanism 31 comprises a speed-reducing gear-head motor 275 secured by bolts 276 to a mounting bracket 277 attached to semi-circular casting 78 of tract assembly 73. An arm 280 is pivotally mounted at one end through shaft 281 to lug 282 on casting 78. The shaft 283, mounting driving roller 284, is rotatably mounted on the other end of arm 280 through an operated cylinder 285 pivotally mounted on 286 to lug 287 on casting 78. A clevis 290, secured to a piston rod 291 of cylinder 285, is pivotally connected at 292 to pivot arm 280. Drive roll 284 (FIG. 6) is driven counterclockwise by gear motor 275 through a chain and sprocket arrangement in which a sprocket 293 is secured to and driven by the output shaft 294 of gear motor 275. A second sprocket 295, affixed to a hub 296 rotatably mounted on shaft 281, is driven by sprocket 293 through a chain 297 (FIG. 7). A third sprocket 300, also secured to hub 296, drives through a second chain 302 a fourth sprocket, secured to the outboard end of shaft 283, which also carries driving roll 284 (FIGS. 6 and 7).

Referring to FIG. 4 extension of piston rod 291 pivots arm 280 counter-clockwise and brings driving roller 284 into contact with roller 170 of cradle 22. The counterclockwise rotation of driving roller 284 drives cradle roller 170 clockwise to rotate stock roll 23 clockwise by means of bar 123 and rewinds the suspended portion of the fabric into the cradle.

Operation of the apparatus

The operation of the apparatus is best described by following chronologically the steps involved in building a tire body. As shown in FIG. 1, a preferred form of the apparatus includes ten cradles in positions A through J with the cradles at position I hidden from view by side member 70 of frame 21. As a result of the conveyor being in the position shown, fabric clamps 130 of the cradles A and B, which are normally closed, are open as a result of the engagement of cam 164 and 165 by cam followers 162 of the respective cradles (FIG. 6). Also, cam follower 217 and speed control 221 are in engagement with the first step of cam 214, thus positioning control shaft 220 at a point where the resulting output of the speed control will drive belt 171 at a surface speed which is in a predetermined ratio with the surface speed of the bare drum. This ratio of speeds creates a desired tension in the first fabric ply of the tire body as it is payed out onto the building drum.

When the assembly of a tire body is first begun, the cradle at A contains the particular type of fabric necessary to form the first ply. In order to unroll the fabric sheet from the cradle and to present its free end to the drum, belts 171 (FIG. 8) of surface drive 26 are brought into contact with the liner roll located within the cradle by the introduction of fluid under pressure on the appropriate side of double-acting cylinder 185. Cylinder 185 is conventionally controlled by a suitable valve located on control panel 16. Auxiliary drive 17 is electrically actuated by a suitable push-button located on the control panel. As clutch 260 (FIG. 7) is normally disengaged, auxiliary drive 17 drives belts 171 of surface drive 26, independently of the drum. Belts 171 rotate the liner roll, which, in turn, rotates the stock roll through the communicating portion of the liner (FIG. 5). The fabric is removed from the stock roll and separated from the liner as previously described. The weight of the fabric carries it over breakover rolls 131 and as it falls it is guided downward until sufficient length has been dispensed to permit its leading edge to be adhered to the bare peripheral surface of the drum.

Fluid pressure is introduced into clutch 260 coupling jack shaft 261 to jack shaft 253 (FIG. 7). The auxiliary drive is reactivated, and since it is coupled to drum shaft 15 through jack shaft 261, the drive rotates the drum and the belts 171 simultaneously. Belts 171 move at a speed slower than the peripheral speed of the drum thereby placing the fabric under tension as it is wound upon the drum. After the drum has completed one revolution, conventional switches deactivate the drive 17. Fabric sheet 11 is cut at a point which permits a slight overlap of the ends, as previously described, and the first ply of the tire body is completed. The portion of the fabric sheet which is not used in the formation of the first ply hangs freely suspended from breakover roll 131.

As the second ply of the tire body is composed of fabric of different characteristics of the first ply, it is stored in the next succeeding cradle indicated at J (FIG. 1). When the second ply is to be formed, the cradle at J is indexed into position A by activating conveyor drive motor 110. When the cradle reaches this position, it engages a conventional limit switch (not shown), which deactivates the conveyor drive motor. At the same time, all of the other cradles advance one position on the conveyor, i.e. the first ply cradle moves from A to B.

Fluid pressure now is introduced into cylinder 285 and piston rod 291 forces roller 284 of the rewinding mechanism into contact with roller 170 of the cradle (FIG. 4). Gear motor 275 is activated and the end of the fabric sheet which is suspended from breakover roll 131 is rewound into the cradle. When the rewinding is completed, the gear motor is deactivated and the piston rod retracted.

The rotation of conveyor shaft 43 during the advancement of the cradles rotates the speed control cam 214 to drive linkage 215 to the step on the cam corresponding to the second ply. Cam 214 through its linkages moves control shaft 220 of the speed control to a position which increases the lineal speed of the surface drive in proportion to the increase in surface speed resulting from the addition of the first ply to the drum.

With the second ply cradle at A, the second ply is formed in the same manner as the first, with the exception that the leading end of the second ply is superimposed on and adhered to the surface of the first ply rather than to the bare surface of the drum, and that the speeds of ply formation and fabric dispensing are proportionately increased.

The remaining eight plies are formed in the same manner as the second, with the exception that the leading end of each ply is adhered to the surface of the next preceding ply, and that the speeds are proportionately increased with the addition of each ply. As shown in FIG. 3, loading of the stock linear rolls of the cradle facilitated by indexing the cradle to G and loading brackets 92, by introducing fluid pressure into the cylinder 96 to retract piston rod 105. As the loading brackets are lowered, the weight of the cradle causes it to pivot clockwise about pivot 94. The arcuate portions 93 of the brackets support the cradle on both its sides by engaging rollers 166 as it moves about pivot 94. When piston rod 105 is fully retracted, the full liner roll and the empty stock roll shell are removed by suitable hoists (not shown), after the bars 123 are removed. An empty shell is placed in the liner roll position and a stock roll containing the particular fabric for that cradle is placed in the stock roll position. Bars 123 are replaced and brackets 92 are raised by the extension of piston rod 105. The cradle pivots counterclockwise until it assumes its normal attitude with respect to the conveyor chain.

While the invention has been described as including a means for rotating a tire building drum at a constant angular speed for one revolution, the invention can be used to advantage with drum rotating means in which the angular speed is varied. This is possible because the apparatus of the invention directly couples the drum and the fabric dispensing means in a fixed ratio at all times during the formation of the tire body. Thus the instantaneous lineal speeds at which the plies are formed and the lineal speeds at which the fabric sheets are dispensed are always in the proper ratio to maintain a constant tension on the plies independently of any variation in the angular speed of the drum. The invention has been described in terms of fabric speed, but, without departing from its scope, it could be described in terms of fabric lengths applied and dispensed during one revolution of the drum without regard to the speed.

While the preferred form of the invention is described as forming a tire body by rotating successively each of several fabric plies about a drum through a single revolution, it is possible to form a tire body from a continuous length of a single fabric by rotating such fabric in a continuous sheet through a plurality of revolutions to form an equivalent plurality of plies. It is also possible to form a tire body by forming a plurality of concentric bands, each band consisting of a plurality of convolutions of a particular fabric. The invention encompasses and is equally useful in these modes of forming a tire body.

Various modifications and changes in the apparatus and method embodying the invention are possible without departing from the scope of the invention, the essential feature of which are summarized in the appended claim.

What is claimed is:

Apparatus for forming a number of rubberized fabric plies into a cylindrical tire body, comprising a tire building drum rotatable about its axis, an endless conveyor mounted adjacent said drum, a plurality of combination ply storage and dispensing devices mounted on said conveyor in spaced relation to each other and adapted for sequentially moving by movement of said conveyor into and out of position for dispensing fabric onto said drum, means for driving said drum at a predetermined controlled speed, means mechanically connected to said conveyor for sequentially moving each of said ply storage and dispensing devices into and out of fabric dispensing position with regard to said drum, a variable speed drive mounted on said conveyor and adapted for driving each said dispensing device when it is in said fabric dispensing position, and means linking said conveyor and said variable speed drive for sequentially varying the speed of said drive a predetermined amount dependent upon which of said storage and dispensing devices is in said dispensing position whereby all said fabric plies are applied to said drum with a predetermined constant tension.

References Cited in the file of this patent

UNITED STATES PATENTS

| | | |
|---|---|---|
| 1,183,996 | McMahan | May 23, 1916 |
| 1,491,282 | Abbott | Apr. 22, 1924 |
| 2,558,903 | Kastner | July 3, 1951 |
| 2,605,196 | Bostwick | July 29, 1952 |
| 2,625,198 | Bostwick | Jan. 13, 1953 |
| 2,671,495 | Iredell et al. | Mar. 9, 1954 |
| 2,716,437 | Wikle | Aug. 30, 1955 |